US005590582A

United States Patent [19]
Weiss

[11] Patent Number: 5,590,582
[45] Date of Patent: Jan. 7, 1997

[54] OIL SUPPLY FOR POPCORN POPPERS

[75] Inventor: Ronald R. Weiss, Okeana, Ohio

[73] Assignee: Gold Medal Products Co., Cincinnati, Ohio

[21] Appl. No.: 541,469

[22] Filed: Oct. 10, 1995

[51] Int. Cl.⁶ ........................................ A23L 1/18
[52] U.S. Cl. .................... 99/323.5; 222/105; 222/183; 222/146.2
[58] Field of Search ................. 99/323.4, 323.5, 99/323.6, 323.7, 323.8, 323.9, 323.11; 222/105, 183, 146.5, 146 HE, 318; 147/349, 383

[56] References Cited

U.S. PATENT DOCUMENTS

| | | | |
|---|---|---|---|
| 1,545,357 | 7/1925 | Schwimmer . | |
| 2,123,663 | 7/1938 | Roach | 99/323.7 |
| 2,812,704 | 11/1957 | Hawks | 99/323.6 |
| 2,856,841 | 10/1958 | Cretors et al. | 99/323.8 |
| 2,939,379 | 6/1960 | Schmitt | 99/323.11 |
| 3,641,916 | 2/1972 | McDevitt et al. . | |
| 3,739,953 | 6/1973 | Cretors | 99/323.8 |
| 4,133,456 | 1/1979 | Corini | 222/146 HE |
| 4,182,229 | 8/1980 | VandeWalker | 99/323.6 |
| 4,421,146 | 12/1983 | Bond et al. | 141/349 |
| 4,484,697 | 11/1984 | Fry, Jr. | 222/95 |
| 4,557,399 | 12/1985 | Redick, Jr. | 222/83.5 |
| 4,723,688 | 2/1988 | Munoz | 222/88 |
| 4,919,308 | 4/1990 | Majkrzak | 222/146.5 |
| 5,026,969 | 6/1991 | Knepler et al. | 219/421 |
| 5,035,173 | 7/1991 | Stein et al. | 99/323.7 |
| 5,114,045 | 5/1992 | Herpe | 222/105 |
| 5,121,857 | 6/1992 | Hutchinson | 222/318 |
| 5,301,601 | 4/1994 | Cretors | 99/323.5 |

FOREIGN PATENT DOCUMENTS 682731  3/1964  Canada .
0364071  4/1990  European Pat. Off. .............. 222/105

*Primary Examiner*—David Scherbel
*Assistant Examiner*—Reginald L. Alexander
*Attorney, Agent, or Firm*—Wood, Herron & Evans, P.L.L.

[57] ABSTRACT

An oil supply for popcorn poppers including a reservoir (26) for storing oil (28), a control housing (30) disposed above the reservoir (26), the control housing (30) having an inclined top surface (84) for supporting and heating a container (32) of congealed oil (34), a pump (72) for pumping liquified oil (28) in the reservoir (26) to a popping kettle (16), a heater (74) in the reservoir (26) for quickly heating congealed oil (28) therein, a conduit (76) for delivering oil to a popping kettle (16), and a conduit (92) for delivering liquified oil from the container (32) to the reservoir (26). The pump (72) is driven by a motor (70) contained inside the control housing (30) to deliver a measured amount of oil (28) to the kettle (16), made up by oil (34) from the container (32). A bleed hole (82) in the oil delivery conduit (76) allows pumped but not delivered oil to flow back into the heated reservoir (26) after each pump cycle so no oil remains in the delivery line (80) to congeal. Controls are disclosed.

23 Claims, 4 Drawing Sheets

5,590,582

1
OIL SUPPLY FOR POPCORN POPPERS

FIELD OF THE INVENTION

This invention relates to popping popcorn and more particularly, to the provision of popping oil to a popcorn popping kettle.

BACKGROUND OF THE INVENTION

There are many different products and methods for popping popcorn at the consumer level, such as counter top hot air poppers, microwavable bags containing corn and oil preparations, and packaged popcorn with or without premeasured oil as a component or as a separate single batch package. In the commercial end of popcorn preparation, such as at theaters, carnivals, fairs, sporting events, transportation centers or terminals, etc., large batches of popcorn are generally required in either short time periods or continuously over long periods of time.

Typically, the preparation involves the introduction of measured amounts of corn to a tiltable popping kettle, the introduction of measured amounts of a liquid oil to the kettle, popping the corn, dumping it into a storage or display bin, and starting another preparation cycle.

It is the use and delivery of oil from its raw or supplied state to the kettle in liquid form which presents perhaps the most troublesome aspect of the popping process. Generally, the oil is supplied in bulk in a congealed state. Where coconut oil is used, that oil congeals at about 76° F. Canola or other oils congeal at somewhat higher temperatures. Nevertheless, the oil is generally congealed and is supplied to the commercial popping customer in pails or buckets.

In one such operation, the bucket top is removed and a pump and heater unit is oriented over the open bucket. Once the heater has melted the oil, the pump is used to pump a measured amount to the kettle for each batch. Due to the inherent characteristics of the pump pick-up and the configuration of the bucket, a slight amount of oil remains in the bucket when the bucket is replaced. That residual oil is poured into a new replacement bucket, or is simply discarded with the used bucket. The original top may or may not be resealed to the used bucket.

In any event, this is a messy process not enjoyed by the employees who must handle the buckets. The exchange and disposal is difficult to handle without spilling oil or getting it on clothing. When the tops are handled, cuts from sharp edges may result.

Also, and from an operational standpoint, once a bucket is emptied, a new bucket must be melted before popping can resume. This may interrupt the cooking process at high volume times and result in decreased output. One improvement has been to provide a heater unit which has two heat levels. A first, high heat level quickly melts the mass of congealed oil in the bucket. After a period of time selected by the user, the high heat level is replaced with a second, low heat level to maintain the oil in the melted state. An example of such a unit is the Model 2114 Accumeter Bucket Pump available from Gold Medal Products Co., Cincinnati, Ohio, the assignee hereof.

An alternative process contemplates the use of popping oil supplied in bags which are, in turn, packaged in supporting boxes. These are heated as units to melt the congealed oil, and the melted liquid oil is then dispensed through a fitting on the bag and pumped to the popping kettle. One format of this process is disclosed in U.S. Pat. No. 5,301,601 where one bag/box is supported on a heater shelf for pre-warming or melting, and a preheated box is connected through a fitting to a pump to pump liquified oil in the bag to a popping kettle. This process eliminates the need to handle buckets with removable tops.

Nevertheless, this bag/box operation also has numerous disadvantages. For example, the oil is in a flexible bladder supported by a box and requires a lengthy time to melt as the bag and box limit available melting temperatures which can be applied without burning or destroying the box or bag. Melting times from congealed oil to liquid phase may be as much as five hours, for example. As noted, temperatures of the heater shelf are limited by the package materials and so high heat/low heat systems such as the Model 2114 previously referred to could not be advantageously employed to heat oil in bag in a box systems. Rather, the oil heaters must be left on all night, or turned on hours before the oil is actually needed. Also, if a large amount of corn is to be popped, it may be necessary to maintain auxiliary or back-room warm-up shelves or heaters for preheating additional oil packages.

Moreover, it is possible for the oil to congeal in the supply lines. These then must be heated as well before the cooking processes can begin.

Also, in such prior operations, it is difficult to drain all the oil out of the bags. As much as fourteen ounces of oil, for example, may remain in the bags when they are discarded; there is no place to drain the oil for use.

Accordingly, the time required for start up to melt the oil and cook the corn can be up to several hours. This requires either leaving the heaters on all night to maintain the oil in liquid form, or paying an employee to appear and start the heaters hours before they are needed.

Accordingly, it has been one objective of the invention to provide improved apparatus for delivering oil to a corn popping kettle.

Another objective of the invention has been to provide improved methods for delivering liquid oil to a kettle for popping popcorn.

A further objective of the invention has been to provide an improved process for dispensing liquid oil from bag-in-box packages of congealed oil.

SUMMARY OF THE INVENTION

To these ends, a preferred embodiment of the invention contemplates the combination of an oil reservoir, a heater therein, a pump for pumping oil from the reservoir to a popping kettle, a heated shelf for supporting a bag in a box congealed oil package and a fitting on the bag for feeding oil to the reservoir. The heater in the reservoir is capable of heating and liquefying oil in the reservoir in a short time, such as ten to twelve minutes and advantageously may be of the high heat/low heat type. As oil is pumped in measured amounts to the kettle, or in response to oil depletion in the reservoir, make-up oil is added manually or automatically from the bag-in-box package.

The pump line is provided with an oil bleed such that after delivery of a preselected oil volume to the kettle, the pump action ceases and the oil in the lines drains back into the reservoir. If the supply apparatus is turned off at this point, there is no more oil in the lines to congeal and clog them up.

The feed valve from the heated bag-in-box may be manually operated, or a solenoid valve controlled to operate in response to the pumping of oil to the kettle or in response to reservoir depletion may be used.

Generally, the bag-in-box congealed oil packages weighs about 35 pounds. In a preferred embodiment, the reservoir will accept 70 pounds providing a total of 105 pounds of oil, or more, in the system for use. Alternatively, additional heated shelves for additional bag-in-box packages of oil can be used within the cabinet to increase oil supply available on demand. A multiple line feed system from these to the reservoir can be used.

The invention provides numerous advantages over prior bucket or bag in a box systems. Even after shut down, 70 pounds of oil can be liquified in a short time of about ten to twenty minutes, substantially hastening initiation of cooking from a shut down start while a back-up supply for the bag-in-a-box package is being slowly melted for subsequent use. And the kettle supply lines are substantially free of congealed oil which would otherwise block supply from the pump since all the oil drains back to the heated reservoir after each oil feed cycle. The system can thus be shut down each evening, and it is only necessary to turn the heaters on about 10 to 20 minutes prior to the time cooking is to start, with up to 70 pounds or more liquified oil ready for use. It is not necessary to leave any heaters on overnight.

Also, if it is necessary to replenish the reservoir on start up, it is not necessary to preheat any bag-in-box congealed oil package. Instead, congealed oil is simply scooped out of a bag (or other container) and dumped into the reservoir where it is quickly heated and melted. Thus, it is never necessary to pre-heat a bag-in-box package before starting the corn popping cycles.

Thus, importantly, it is unnecessary to leave any heaters on all night or during unattended times.

There is no waste in empty bags. Instead, the bags can be tilted and dumped or cut open to dump all remaining oil into the reservoir.

The use of a large reservoir under many circumstances provides sufficient popping oil over a time period long enough to allow heating and liquification of oil in a fresh bag-in-box package placed on the heated shelf.

There is, thus, no need for auxiliary or "back row" heating shelves or areas. Oil is always available on demand to the popper served by the unit.

Additionally, the system of the present invention may be interconnected to serve multiple poppers or popping kettles. Cycle initiation causes a preselected volume of oil to be pumped to the respective popper. Line valves are timed to permit oil line drainage back to the reservoir before a following pump sequence to another kettle. All lines drain when the pump is not operating so no oil collects and congeals in any line.

Accordingly, the invention facilitates the supply of liquified oil from its congealed supply state to corn popping kettles without significant delay and without requiring all night or extensive preheat. Use of bag-in-box oil packages is facilitated and oil cans or buckets with removable tops are eliminated.

These and other objectives and advantages will be even more readily apparent from the following detailed description of preferred and alternate embodiments and from the drawings in which:

DETAILED DESCRIPTION OF THE PREFERRED EMBODIMENT

Figure 1:
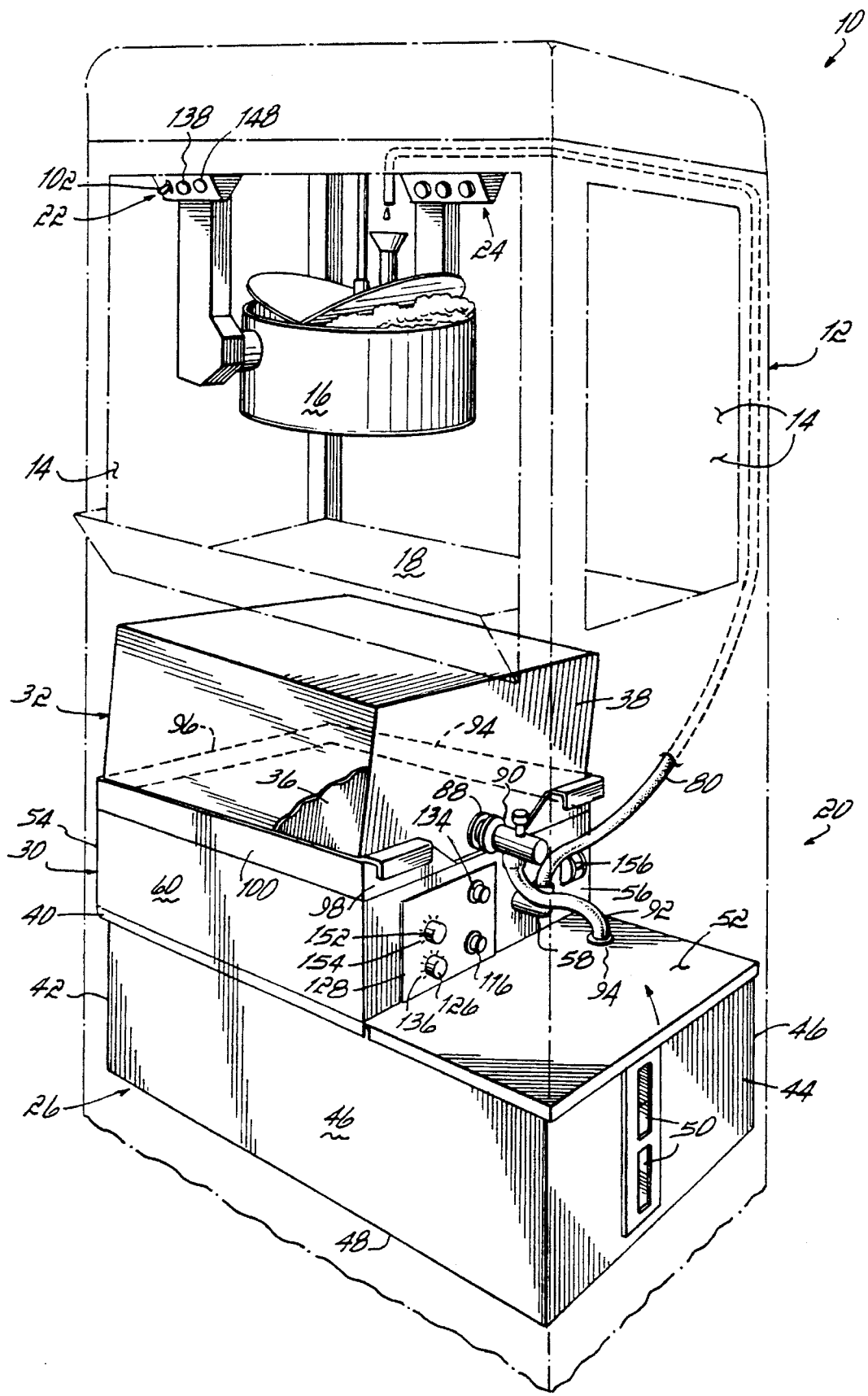
FIG. 1 shows a perspective view of a popcorn popper unit comprising an oil supply unit, a tiltable kettle, and a popped-corn storage bin in accordance with the preferred embodiment of this invention.

Referring to the drawings and particularly to FIG. 1, there is illustrated a popcorn popper unit 10 in accordance with the principles of the present invention. Unit 10 includes a unit housing 12 with four upper windows or openings 14 surrounding a tiltable kettle 16 into which a predetermined amount of unpopped popping corn (not shown) is manually placed and a storage bin 18 to catch the popped corn. The bottom portion of unit housing 12 has therein an oil supply unit 20. The oil supply unit 20 is positioned inside the unit housing 12 of the popcorn popper unit 10 underneath storage bin 18 and tiltable kettle 16. At the top of unit housing 12 are two control panels 22,24. Control panel 22 electrically controls elements of the oil supply unit 20. Control panel 24 controls a mixer (not shown) disposed inside tiltable kettle 16, the amount of heat going to the tiltable kettle 16, and the illumination of unit housing 12, as is conventional.

The oil supply unit 20 consists of two principle components: a reservoir 26 for storing oil 28 (FIG. 2) and a control housing 30, the upper portion of which is adapted to receive a container 32 of congealed oil 34, otherwise known in the art as a bag in a box. The container 32 or bag in a box has a flexible bag 36 of oil 34 restrained inside a box 38 made of cardboard or like material (FIG. 2).

Figure 2:
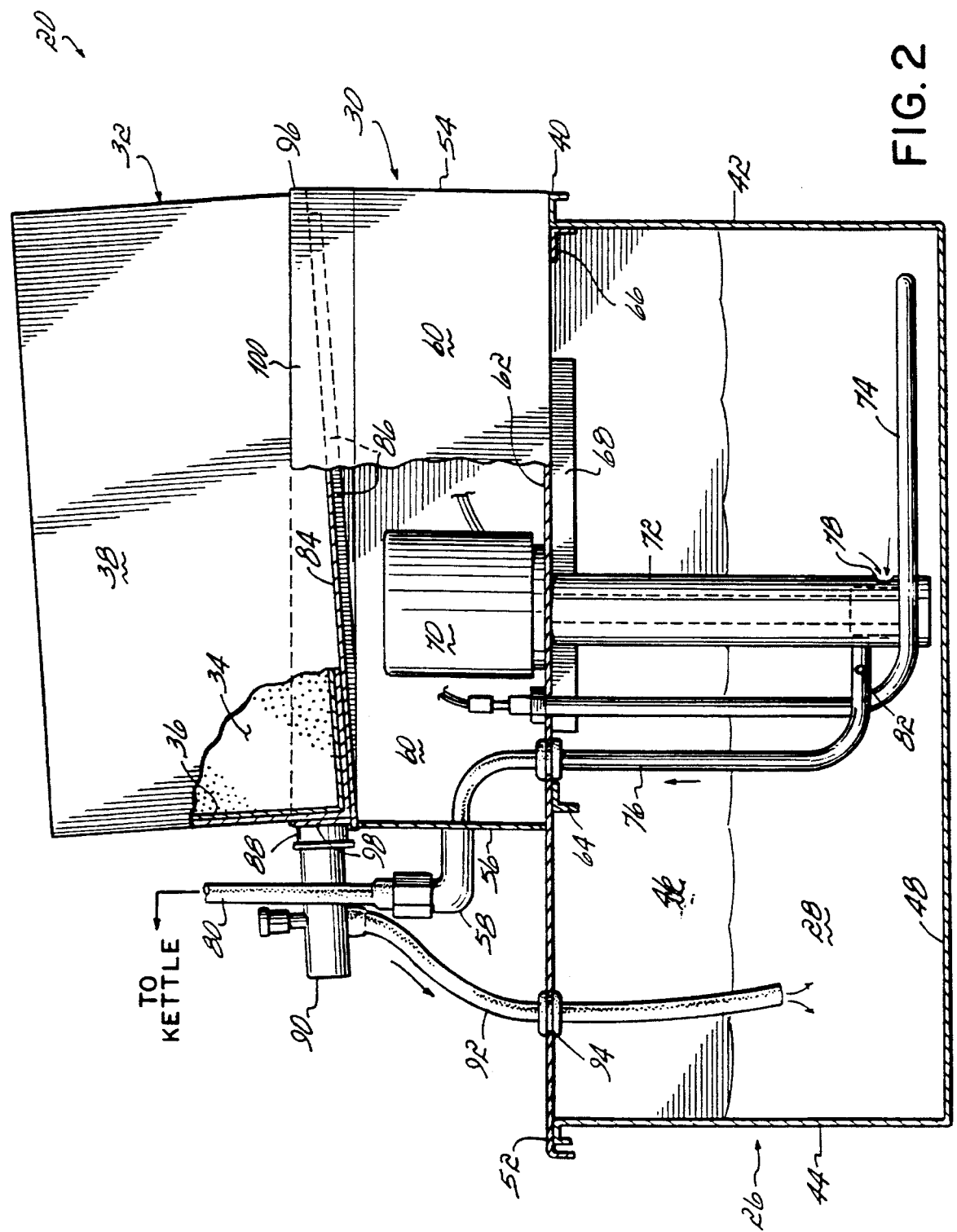
FIG. 2 is a side view in a partial cross-section of the oil supply unit of FIG. 1.

As shown in FIG. 2, the control housing 30 rests above the rear portion of reservoir 26 on a shelf 40, which extends outward from all four walls of the reservoir 26. The reservoir 26 is rectangular in shape, having a back wall 42, a front wall 44, and two side walls 46, one of which is shown in FIG. 1, and a bottom 48. Front wall 44 of reservoir 26 has a window 50 so an operator can see the oil level inside the reservoir 26. The reservoir 26 has no permanent cover or top. When in operational mode, the reservoir 26 is covered by the control housing 30 and a removable top 52 located in front of the control housing 30. Covering the reservoir 26 prevents dirt and other unwanted particles from entering the reservoir 26 and contaminating the oil 28 therein.

The control housing 30 is also rectangular in shape, having a back wall 54, a front wall 56 to which fitting 58 (FIG. 2) attaches, two side walls 60, and a bottom 62. Permanently attached to the bottom 62 of the control housing 30 are four brackets in a preferred embodiment of the invention, a front bracket 64, a rear bracket 66, and two side brackets 68 (only one shown in FIG. 2). The brackets prevent the control housing 30 from moving laterally side to side or front to back with respect to the reservoir 26. Each bracket is "L-Shaped" in cross-section. One skilled in the art may choose to permanently attach less than four brackets to the bottom 62 of control housing 30. Two, three or four brackets may suffice to prevent the control housing 30 from sliding relative the reservoir 26.

Integral components of the oil supply unit 20 are a motor 70, a pump 72 extending downwardly from the control housing 30 into the interior of reservoir 26 and a heater 74 also extending downwardly from control housing 30 into the interior of reservoir 26. The motor 70, pump 72, and heater 74 are all supported by the bottom 62 of the control housing 30 such that when one lifts the control housing 30 off of the shelf 40 of the reservoir 26, the motor 70, pump 72, heater 74, and oil delivery conduit 76 all lift off with the control housing 30.

As FIG. 2 depicts, the control housing 30 has a motor 70 therein. The motor 70 drives a gear pump 72 which extends downwardly from control housing 30 into the interior of reservoir 26. The gear pump 72 pumps oil from reservoir 26 through an inlet 78 to tiltable kettle 16 through the oil delivery conduit 76. Oil delivery conduit 76 passes upwardly inside reservoir 26, through the bottom 62 of control housing 30, then through the interior of control housing 30, and into the L-shaped fitting 58, which is permanently affixed to front wall 56 of control housing 30. A hose 80 or other flexible conduit is inserted into fitting 58 and extends upwardly through the housing 12 of the popcorn popper unit 10 into tiltable kettle 16. The popping oil 28, once liquified, is pumped by pump 72 upwards through oil delivery conduit 76, fitting 58 and hose 80 into the tiltable kettle 16. The oil delivery conduit 76 has an oil bleed hole 82 near the pump 72 which allows oil to drain back from the oil delivery conduit 76 into the reservoir 26.

The bleed hole 82 in oil delivery conduit 76 has no cover; it is always open. Therefore, for the pump 72 to supply a predetermined quantity of oil to the tiltable kettle 16 and the pump 72 must first pump enough oil to fill up the entire oil delivery conduit 76, fitting 58 and hose 80 then pump an additional quantity of oil equivalent to the predetermined amount which actually ends up in the tiltable kettle 16 plus pump whatever amount is lost through bleed hole 82 in oil delivery conduit 76. Once the tiltable kettle 16 has received its predetermined amount of oil, the pump 72 will shut off and gravity will force the pumped but undelivered oil existing in hose 80, fitting 58 and oil delivery conduit 76 downward through bleed hole 82 into reservoir 26. This prevents oil from congealing in the hose 80, fitting 58 or oil delivery conduit 76 after the popcorn popper unit 10 is shut off.

The heater 74 is permanently affixed to control housing 30 and extends downwardly through the bottom 62 of the control housing 30 into the interior of reservoir 26. The heater 74 is generally in the shape of an "L" and is able to heat the oil inside reservoir 26 within 10–20 minutes when operated on "high". Heater 74 has only two heat output modes, "high" and "low". To this end, and as will be described in greater detail below, heater 74 is of the high heat/low heat type.

Control housing 30 has an inclined heatable top surface 84 as depicted in FIG. 2 upon which a bag-in-box container 32 of congealed oil 34 is placed to be heated. Container 32 may actually be a support box 38 in which is packaged bag 36 containing the oil 34 as is conventional. The inclined, heatable top surface 84 is heated by a 50 watt foil heater 86 affixed to the bottom of surface 84. The rear of the top surface 84 is higher in elevation than the front of the top surface 84, causing container 32 to tilt forward so that oil 34 inside the bag 36 flows to the front of container 32 as it melts.

The front of the container 32 has an outlet 88 into which is inserted a dispensing valve 90, which controls the flow of liquid oil from container 32 into reservoir 26 via a fill tube 92.

In front of the control housing 30, the removable top 52 covers the front portion of the reservoir 26. The top 52 has a hole or slot 94 through which fill tube 92 passes. When congealed oil inside container 14 has been heated to a liquified state, either directly by 50 watt foil heater 86 or indirectly by the radiant heat emitted from the heated oil 28 (oil 28 having been heated by heater 74 inside reservoir 26) dispensing valve 90 is opened either by manually pulling open a connector and valve assembly such as the one described in U.S. Pat. No. 4,421,146 or by activating a solenoid valve, allowing liquid oil to flow through fill tube 92 into reservoir 26.

Control housing 30 has four upward retainer walls which extend upwardly from the periphery of the inclined top surface 84. As illustrated in FIG. 1, a back retainer wall 96 and a front retainer wall 98 prevent container 32 from moving forward or backward on the inclined top surface 84 of control housing 30. Front retainer wall 98 has an open portion centrally located thereon for receiving the dispensing valve 90, which is inserted into the container. Side retainer walls 100 prevent the container 32 from lateral movement on the inclined top surface 84.

Figure 5:
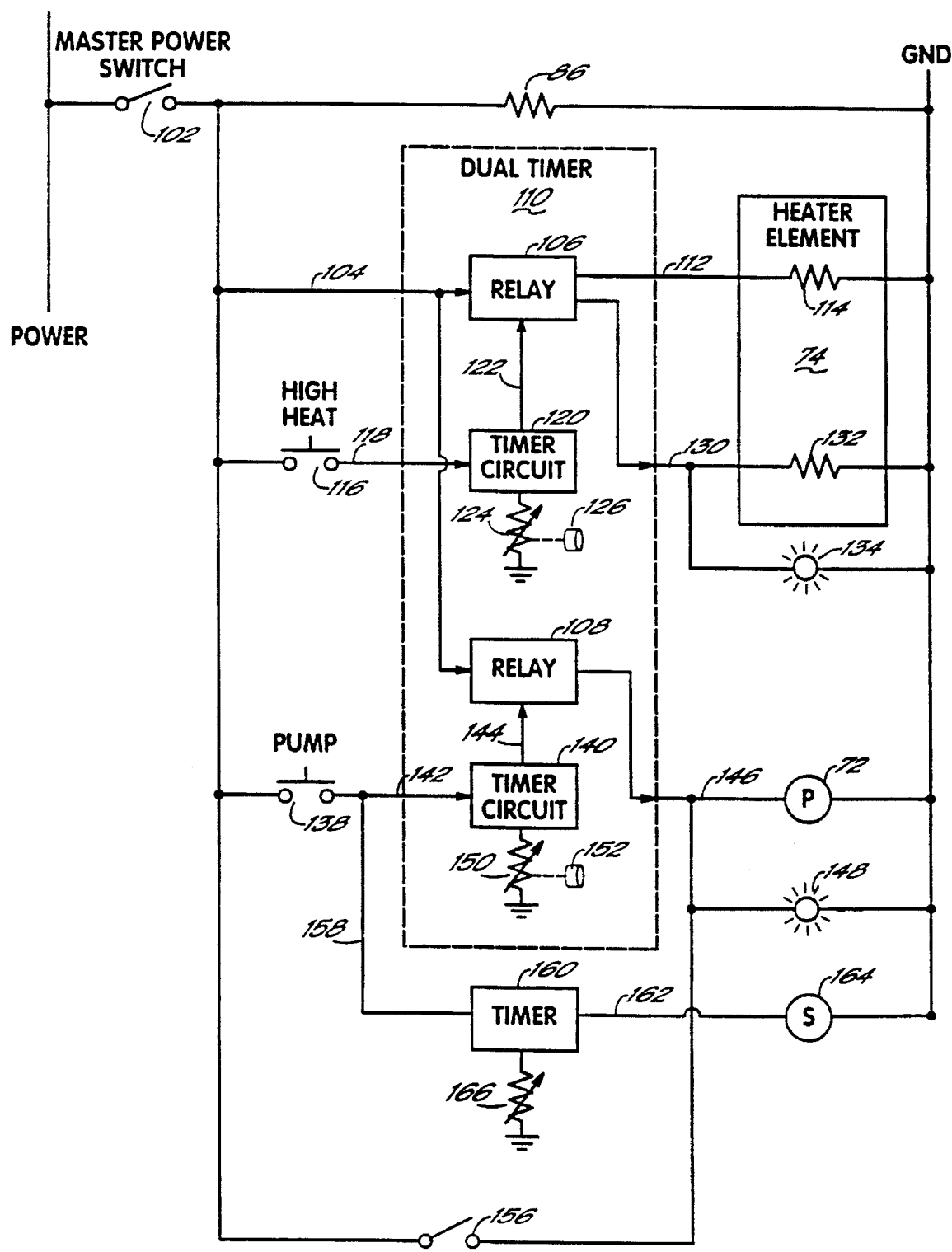
FIG. 5 is a schematic circuit illustrating one form of control circuit for the unit of FIG. 1.

It will be appreciated that a variety of electrical control components may be used in accordance with the invention. One suitable control circuit is illustrated in FIG. 5. In use, and referring to FIG. 5, the oil system master power switch 102 located on control panel 22 (FIG. 1), is operated to apply power through a cord (not shown) which plugs into plug 85 (FIG. 3) and activates the 50 watt foil heater 86 fixed to the bottom of the top surface 84 within the control housing 30 (FIG. 2) for heating oil in a bag-in-box package 32 disposed on inclined top surface 84. Operating the master power switch 102 also applies power over line 104 from a 120 volt or 240 volt supply (not shown) to relays 106, 108 of dual timer 110. In a first or "off" state of SPDT relay 106, power is supplied over line 112 through a 480 ohm heating element 114 within heater 74 which causes heater 74 to turn on in a "low" heat mode in which heater 74 emits about 30 watts. When operating in the "low" heat mode, heater 74 does not supply sufficient heat to liquify congealed oil in the reservoir 26 in under 30 minutes. However, if the oil inside the reservoir 26 is already liquified, heater 74, in its "low" heat mode, will maintain the oil 28 in reservoir 26 in a liquid state.

Figure 3:
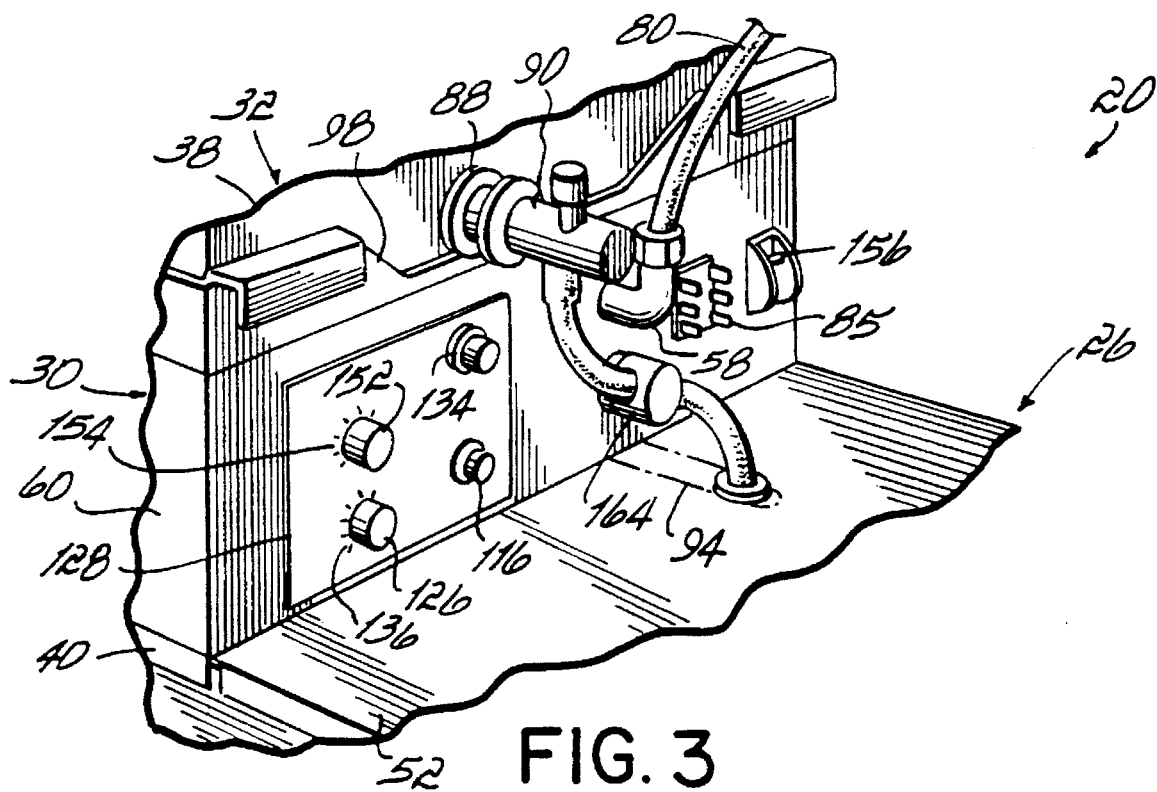
FIG. 3 is a partial perspective view of the front wall of the control housing of FIG. 1 showing a solenoid valve in the fill tube in an alternative embodiment of the invention.

The present invention provides the capability of heating the congealed oil in the reservoir 26 to a liquified state within a short time period, for example, 10–20 minutes. To activate the "high" heat mode of operation, the push button switch 116 of the front wall 56 of the control housing 30 (FIG. 1) is pushed. Referring to FIG. 5, operating the high heat push button switch 116 applies power over line 118 to timer circuit 120 of dual timer 110. When timer circuit 120 is activated, relay 106 is caused to switch to its second or "on" state, by a signal on output 122 of circuit 120 for a time as set by potentiometer 124 connected to control knob 126 at front plate 128. When relay 106 is in the second or "on" state, power is disconnected from line 112 and is instead coupled over line 130 through a 28.8 ohm heating element 132 of heater 74. When heating element 132 is powered, heater 74 is in the "high" heat mode and emits about 500 watts to quickly melt popping oil 28 in reservoir 26. The power on line 130 from relay 106 also illuminates a light 134 on the front wall 56 of the control housing 30 (FIG. 3). The light 134 provides a visual indication that the heater is operating in its "high" heat mode. Timer circuit 120 is adjustable in a range of between 0–30 minutes. The control knob 126 (FIG. 3) has a pointer which cooperates with a scale 136 on the front plate 128 to include the desired high heat time period selected (FIG. 1). At the end of the high heat time period as determined by the setting of control knob 126 (FIG. 3), timer circuit 120 times out the signal through output 122. When the signal through output 122 ends, relay 106 returns to its "off" state, thereby disconnecting power from line 130 to turn the "high" heat mode of heater 74 off and turn off the associated indicator light 134 (FIG. 1 ). Simultaneously, relay 106 reapplies power to output line 112, which turns heater 74 on in its "low" mode of operation. The heating element 74 may be turned off at any time by operating the master power switch 102, thereby disconnecting power from the entire control circuit.

Operating the pump push button switch 138 located on control panel 22 (FIG. 1) applies power to a second timer circuit 140 over line 142. When timer circuit 140 is initiated by actuation of switch 138, a signal on line 144 turns on opto-isolated triac relay 108 to couple power between line 104 and line 146 to thereby turn ON pump 72 and pump ON indicator light 148 located on control panel 22 (FIG. 1). The pump 72 is maintained ON for a period of time determined by the setting of potentiometer 150 connected to timer circuit 140. That period of time is selected by turning control knob 152 located on the front plate 128 of control housing 30 (FIG. 3) to the desired time represented by an associated scale 154. Typically, the control knob 152 will be used to select a time period in the range of 0–30 seconds. Timer circuit 140 is set to different times to accommodate different size kettles. Larger kettles require more oil to pop the corn; and therefore, the pump 72 is operated for a longer time period. At the end of the time period selected by the control knob 152, timer circuit 140 times out and the signal on line 144 is terminated thereby causing relay 108 to turn off. When relay 108 is off, power is disconnected from line 146 so pump 72 and its associated light 148 turn off.

The pump 72 can also be turned ON with switch 156 on the front wall 56 of control housing 30 (FIGS. 1 and 3), so that pump 72 runs continuously rather than for a set time to pump all of the oil out of the reservoir 26 before transporting or relocating the popcorn popper unit 10. As shown in FIG. 5, operating the switch 156 also applies power to line 146, thereby turning the pump 72 and its associated indicator light 148 ON. The indicator light 148 indicating that the pump 72 is activated is located on control panel 22 (FIG. 1). If the switch 156 is being used to apply power to the pump 72, the pump can be turned OFF at any time by opening the switch 156. Switch 156 is inoperative if master power switch 102 is turned off. Dual timer 110, a power supply unit (not shown) therefor, as well as heater 74 and pump 72, may be provided by the aforesaid Model 2114 Accumeter Bucket Pump so as to advantageously adopt the high heat/low heat bucket system to the bag-in-box system of the present invention.

After the popcorn popping unit has been shut off and transported or relocated, or all oil therein used, the reservoir 26 is void of oil. In order to start the popcorn popping unit up again, congealed or liquified oil must be placed inside reservoir 26.

Figure 4:
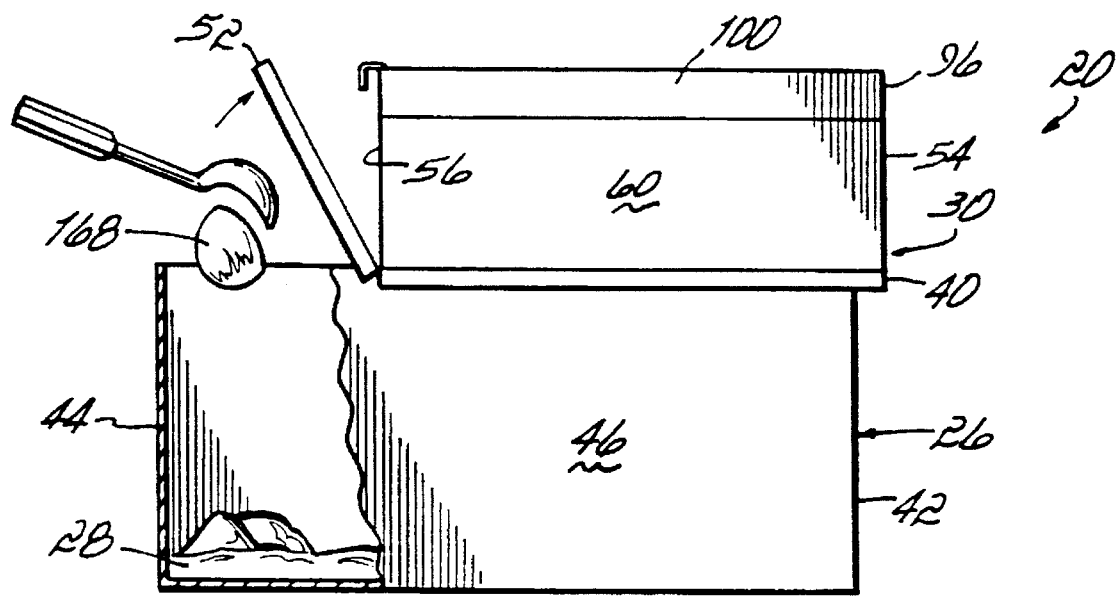
FIG. 4 is a side elevational view of the oil supply unit of FIG. 1 operating to accept congealed oil into the reservoir of the oil supply unit.

FIG. 4 shows how congealed oil 168 is placed inside reservoir 26. The operator manually lifts top 52 either partially or entirely off the shelf 40 of reservoir 26 and then scoops congealed oil 168 inside the reservoir 26. This enables an operator to quickly load the reservoir 26 with congealed oil 168 before activating button 116 on the front wall 56 of control housing 30, turning the heater 74 on "high" so as to melt the congealed oil very quickly, within 10 to 20 minutes.

FIG. 3 shows an alternative embodiment of the invention, which is effective to maintain a constant volume of oil 28 inside the reservoir 26. In this embodiment, when the pump push button switch 138 (FIG. 1) is operated, power is also applied to line 158, which is connected to and initiates the operation of a third timer 160. Third timer 160 applies power over line 162 to the coil (not shown) of solenoid valve 164 (FIG. 3) thereby opening valve 164 to permit oil to flow from the container 32 into the reservoir 26. Timer 160 has a potentiometer 166 that permits the time period of timer 160 to be varied as a function of the kettle size of the popcorn popper unit 10. The timer 160 may be varied between 0–5 minutes and is preset at the factory. Severally commercially available electronic timers may be used such as one manufactured by Airtronics, part number TGPLB-1-180-A-2. At the end of the time period selected, timer 160 disconnects power from the output line 162, thereby turning coil off and closing solenoid valve 164, after replenishing reservoir 26 with popping oil from container 32. Several commercially available solenoid valves are appropriate such as one made by Asco Valves, part number USM826090.

From the foregoing, it will be appreciated that the oil supply unit of this invention is able to heat up to 70 pounds of congealed oil in up to 20 minutes using a heater inside a reservoir. There are no long delays, awaiting liquification of oil. Thus there is also no need to heat containers of oil all night long on preheated back shelves. Moreover, there is no congealing of oil in the kettle supply line due to the drain-back into the reservoir. Also, the oil supply unit is adapted so that congealed oil may be scooped directly into the reservoir and quickly heated thereby assuring a continuum of maximum production even if the oil inside a bag-in-box on top of inclined surface 84 is not yet wholly liquified.

These and other modifications will become readily apparent to those of ordinary skill in the art without departing from the scope or spirit of the invention and applicant intends to be bound only by the claims appended hereto.

What is claimed is:

1. Apparatus for supplying popping oil to a popcorn popping kettle comprising:

an oil reservoir to hold popcorn oil;

a first conduit adapted to couple the reservoir to a popcorn popping kettle whereby to supply popcorn oil from the reservoir to the kettle;

a first heater associated with the oil reservoir whereby to quickly melt popcorn oil in the reservoir having respective high and low heat outputs and to retain the popcorn oil in a melted state;

a shelf adapted to support a heatable container of popping oil whereby to melt popping oil in the container;

a second heater for heating said shelf; and a second conduit adapted to couple the container of popping oil supported on the shelf to the reservoir whereby to supply melted oil from the container to the reservoir.

2. The apparatus of claim 1, the shelf being situated above the reservoir.

3. The apparatus of claim 1, wherein said second heater is in operative association with the shelf for heating the shelf and a heatable container of popping oil thereon.

4. Apparatus for delivering oil to a popcorn popping kettle from an oil reservoir in turn supplied by an oil supply comprising an oil containing bag packaged in a supporting box, said apparatus comprising in combination:

an oil reservoir to hold popcorn oil;

a first heater associated with said oil reservoir having respective high and low heat outputs whereby to quickly melt the popcorn oil in said oil reservoir and to retain the oil in a melted state;

a shelf for supporting an oil containing bag in a box thereon;

a second heater for heating said shelf;

a pump associated with said reservoir;

an oil conduit extending from said pump for delivering oil toward a popping kettle; and a valve for continual flow of oil from said oil containing bag in a box into said reservoir.

5. An apparatus for supplying oil to popcorn poppers comprising in combination:

a reservoir for storing oil;

a heater capable of quickly heating the oil inside said reservoir;

a pump for pumping oil from said reservoir to a popping kettle;

a shelf for supporting a container of congealed oil;

a heater for heating said shelf; and a dispensing valve for operative connection to said container to dispense oil from said container to said reservoir.

6. Apparatus as in claim 5 wherein said pump is positioned inside said reservoir.

7. Apparatus as in claim 5 further comprising an oil delivery conduit extending from said reservoir to said popping kettle, said conduit having an oil bleed within said reservoir.

8. Apparatus as in of claim 5 wherein said dispensing valve comprises a manually operated feed valve.

9. Apparatus as in claim 5 wherein said shelf is inclined so that the front of said shelf is lower than the rear of said shelf.

10. Apparatus as in claim 5 including four retainer walls extending upwardly from the periphery of said shelf to locate said container thereon.

11. An apparatus for supplying oil to popcorn poppers comprising:

a reservoir for storing oil;

a control and motor housing disposed above said reservoir having a forwardly and downwardly sloping top surface for supporting and heating a container of oil thereon;

a first heater extending downwardly from said housing into the interior of said reservoir;

a second heater for heating said top surface;

a pump disposed in said reservoir;

said control housing containing a motor for driving said pump;

an oil delivery conduit extending upwardly from said pump for connection to a popping kettle; and a dispensing valve disposed above said reservoir for operative connection to a container to control the flow of oil from such container into said reservoir.

12. Apparatus as in claim 11 further comprising a solenoid valve operably interconnected between said dispensing valve and said reservoir for controlling the flow of oil through a fill tube into said reservoir.

13. Apparatus as in claim 11 wherein said oil delivery conduit extends through said housing and terminates in a fitting attached to a front wall of said housing for delivery to a popping kettle.

14. Apparatus as in claim 11 wherein oil passes from said dispensing valve into said reservoir through a fill tube to fill or replenish oil in said reservoir.

15. Apparatus as in claim 11 further comprising four retainer walls extending upwardly from the periphery of said top surface of said housing.

16. Apparatus as in claim 11 wherein said oil delivery conduit has an oil bleed hole proximate to an outlet of said pump for draining pumped but undelivered oil back into said reservoir.

17. An oil supply for popcorn poppers comprising:

a reservoir having a front wall, back wall, bottom and two side walls for storing oil;

a pump in said reservoir;

a control housing positioned above said reservoir having a front and back wall, two side walls, a bottom and an inclined top surface such that the rear of said top surface is higher in elevation than the front of said top surface for supporting a container of popping oil for refilling said reservoir;

said control housing containing a motor for driving said pump;

a heater extending downwardly from said control housing into the interior of said reservoir;

an oil delivery conduit fixedly attached to the lower end of said pump and extending through said control housing and terminating in a fitting attached to the front face of said control housing for interconnection to a corn popping kettle; and a dispensing valve for operative connection to a container of popping oil and disposed above said reservoir to replenish oil into said reservoir from such container.

18. An oil supply as in claim 17 wherein each of said reservoir walls has a shelf extending outwardly at right angles upon which said bottom of said control housing rests.

19. An oil supply as in claim 17 including at least two brackets permanently affixed to said bottom surface of said control housing in a position to prevent lateral movement of said control housing relative to said reservoir.

20. An oil supply as in claim 17 wherein a front retainer wall extends upwardly from a forward edge of said top surface of said control housing and having an open portion in the center thereof.

21. An oil supply as in claim 17 wherein said control housing extends over a rear portion of an open top of said reservoir so that said reservoir may be accessed from a front portion of said reservoir.

22. An oil supply as in claim 17 wherein a removable top covers an open portion of said reservoir from said front wall of said control housing forward to said front wall of said reservoir.

23. An oil supply as in claim 17 said containers have a predetermined volume of oil and wherein said reservoir has a maximum volume of approximately the contents of two containers of congealed oil.

* * * * *